July 23, 1940.  A. G. F. KUROWSKI  2,209,231
TYPEWRITING MACHINE
Filed Nov. 14, 1936   5 Sheets-Sheet 3

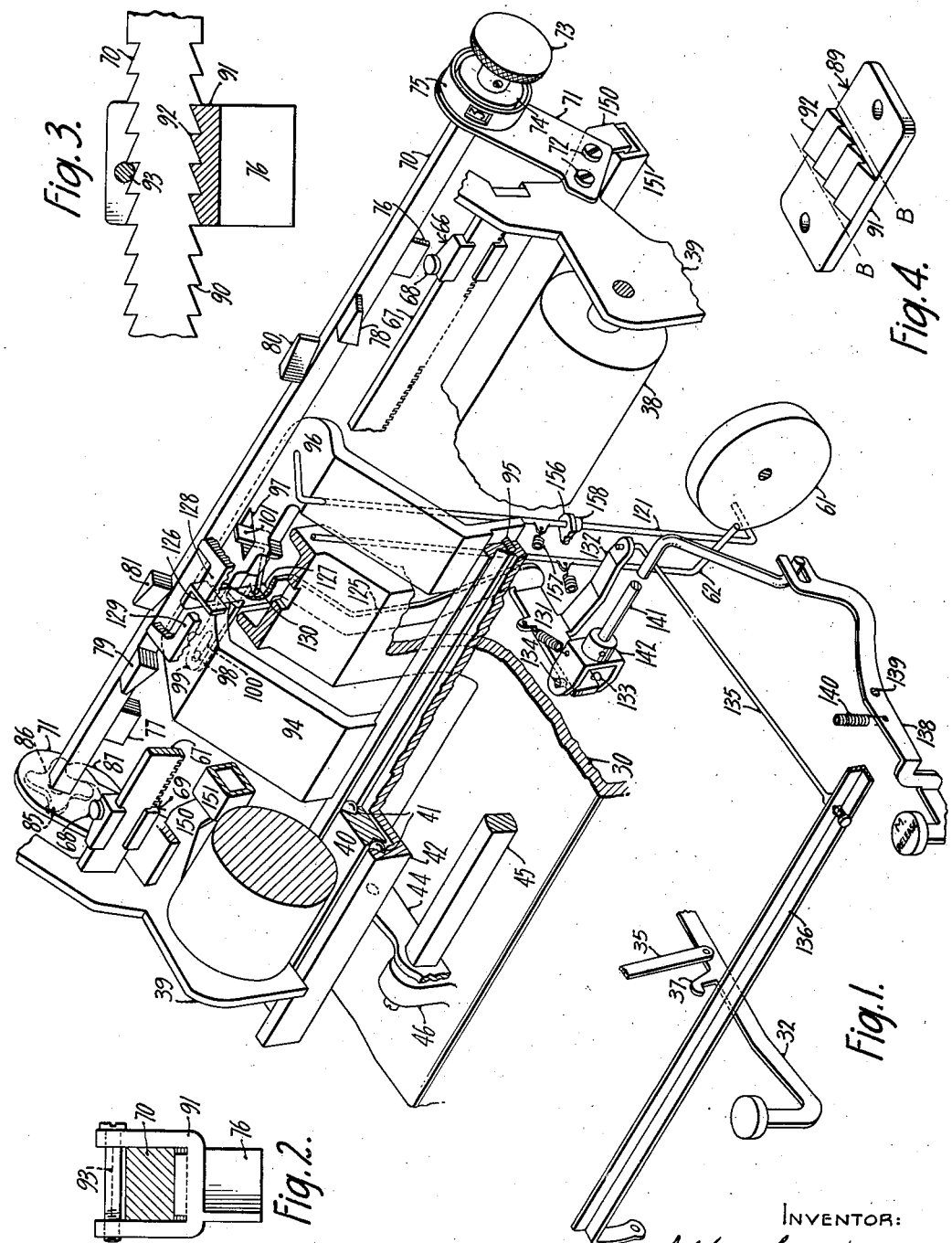

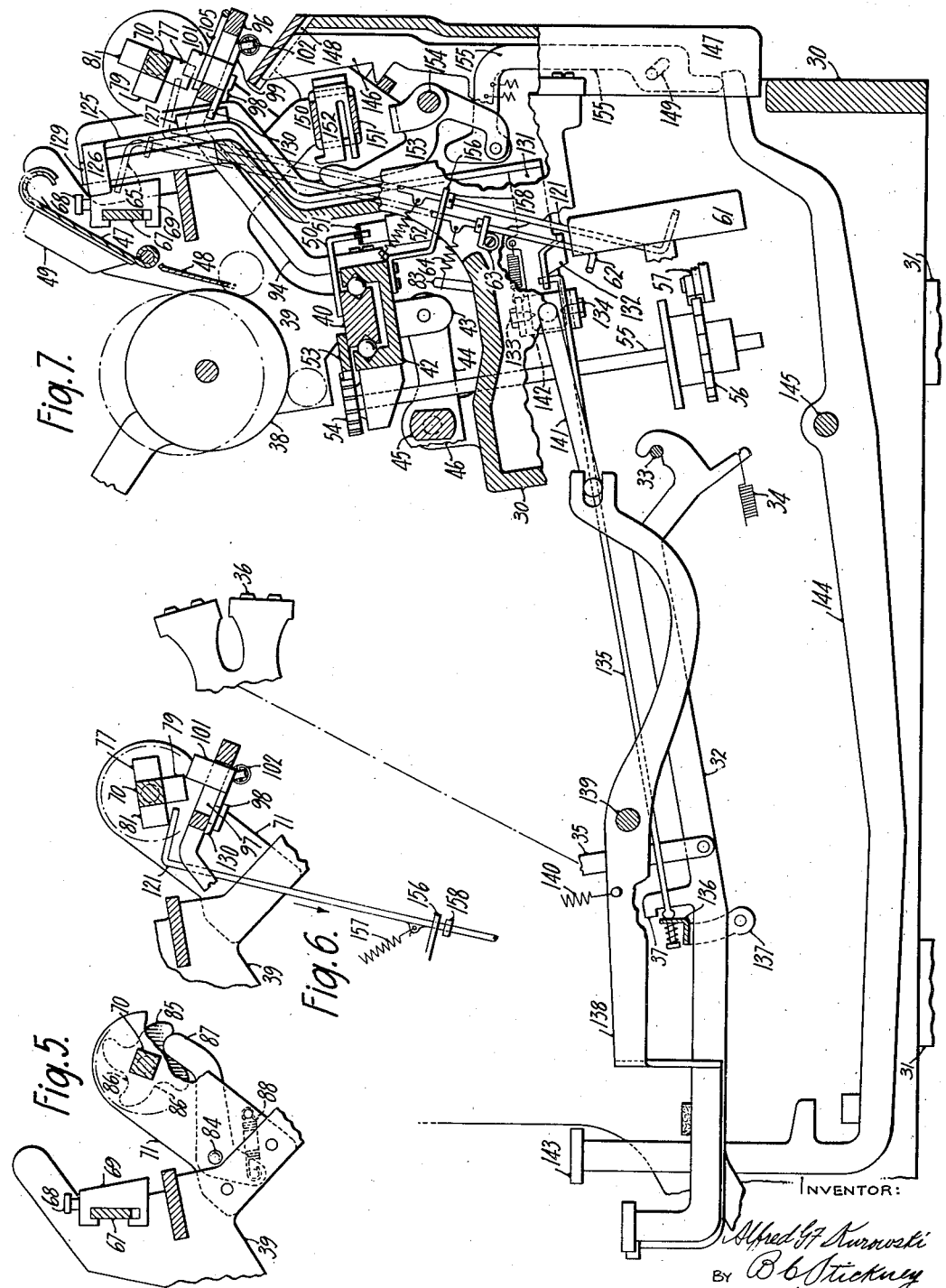

INVENTOR:
Alfred G. F. Kurowski
BY B. C. Stickney
ATTORNEY

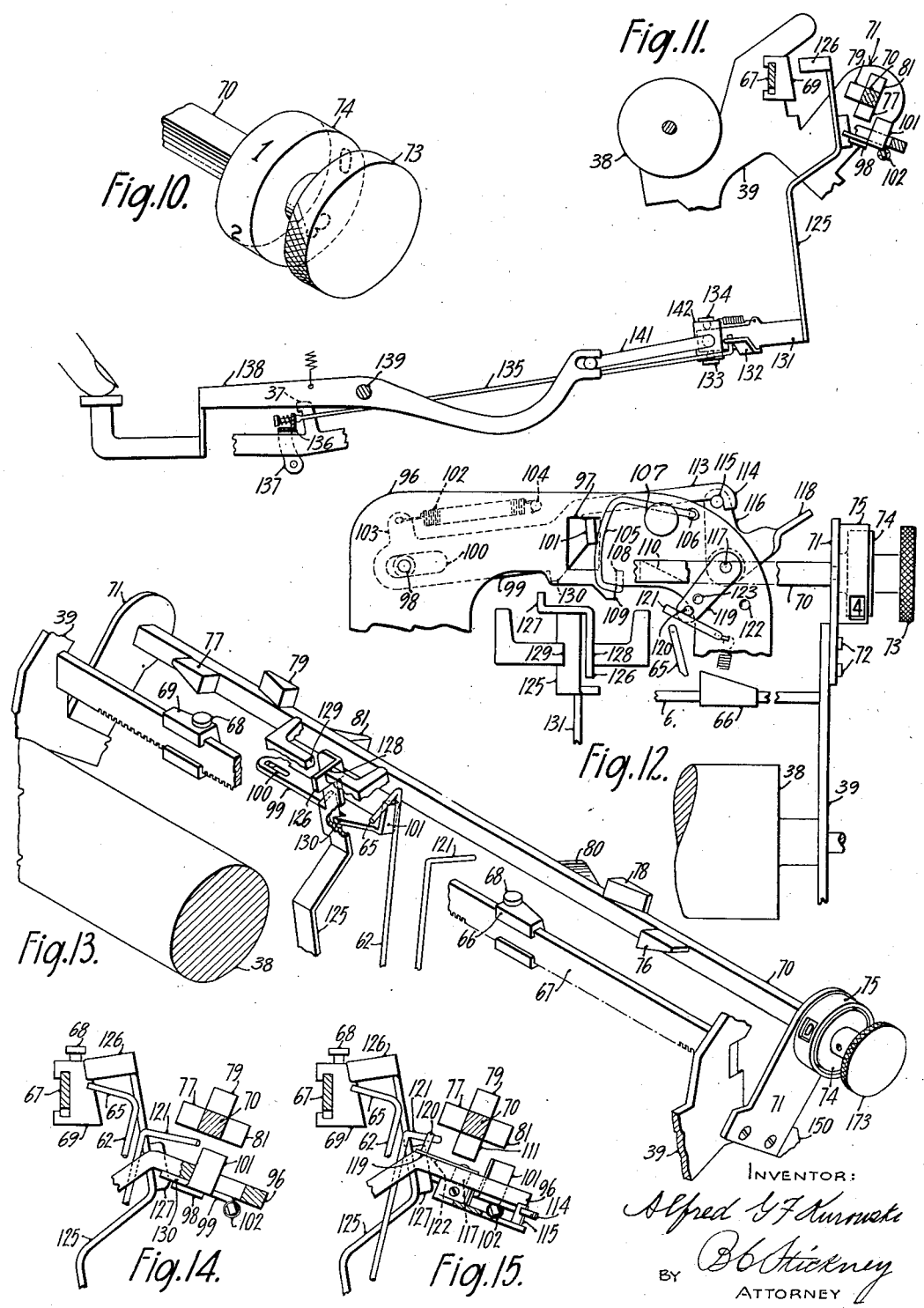

July 23, 1940.     A. G. F. KUROWSKI     2,209,231
TYPEWRITING MACHINE
Filed Nov. 14, 1936     5 Sheets-Sheet 5
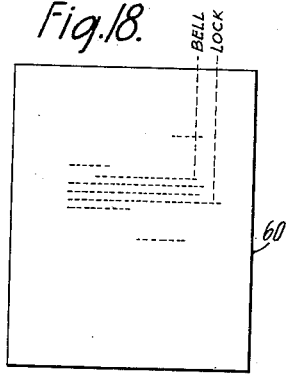
Fig. 18.
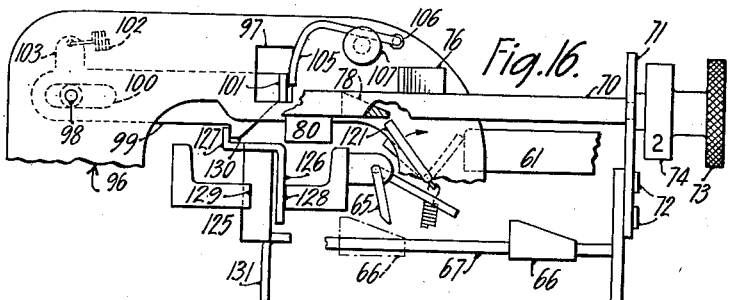
Fig. 16.
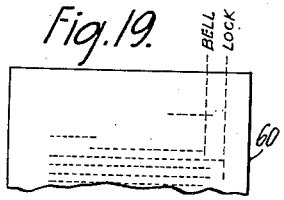
Fig. 19.
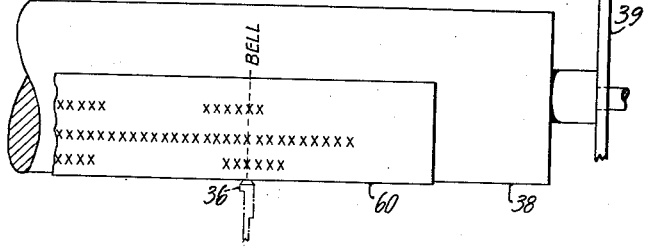
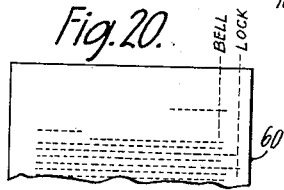
Fig. 20.
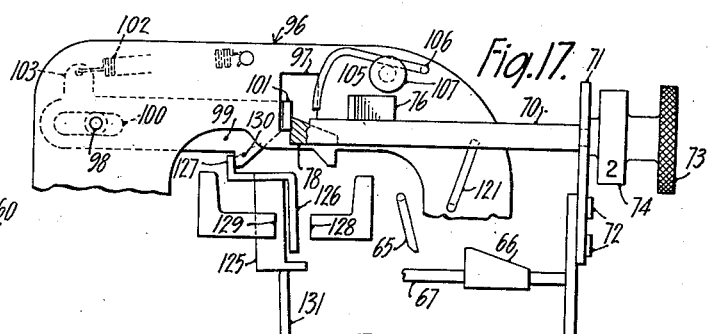
Fig. 17.
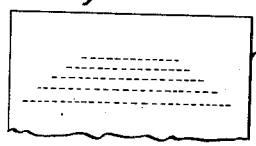
Fig. 21.
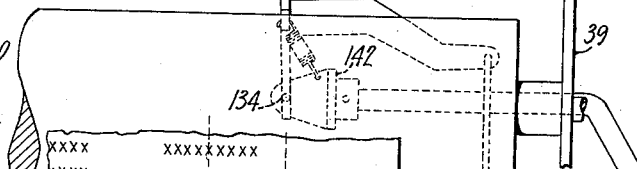
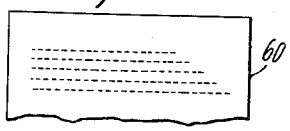
Fig. 22.
Fig. 23.
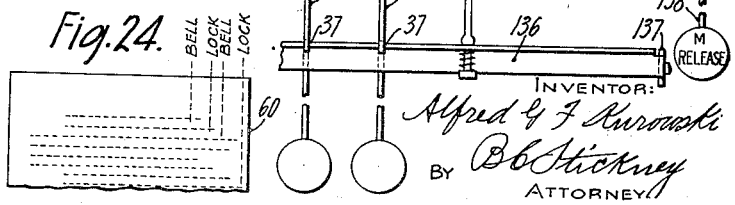
Fig. 24.
INVENTOR:
Alfred G. F. Kurowski
By B. C. Stickney
ATTORNEY.

Patented July 23, 1940

2,209,231

UNITED STATES PATENT OFFICE 2,209,231

TYPEWRITING MACHINE

Alfred G. F. Kurowski, Brooklyn, N. Y., assignor to Underwood Elliott Fisher Company, New York, N. Y., a corporation of Delaware Application November 14, 1936, Serial No. 110,897

13 Claims. (Cl. 197—63)

This invention relates to typewriters and more particularly to margin-stops.

Among the features of invention is the provision in a typewriter having two members, namely, a frame and a platen-carriage, of a plurality of transversely disposed margin-stops on one of said members and a plurality of counter-stops on the other member, the margin-stops and the counter-stops being normally in cooperative position but one of the margin-stops and the corresponding counter-stop being relatively adjustable to both operative and inoperative positions. Other features may include in the foregoing combination of parts means for moving a margin-stop into and out of engageable position with a counter-stop; means for moving a counter-stop into and out of engageable position with a margin-stop; parallel bars for mounting the margin-stops, one of the bars being rotatable to a plurality of adjustable positions in any position of the platen-carriage, yieldably held therein, and having mounted thereon circumferentially and disposed lengthwise thereon additional margin-stops, but the number of pairs of said margin-stops being less than the number of adjustable positions; the counter-stop associated with the rotatable bar being movable into and out of an engageable position, a spring tending to maintain the counter-stop in engageable position, said counter-stop being slidable in parallel with the platen-carriage, a spring silencer for the counter-stop in the banking position of the platen-carriage, a lug on the counter-stop and a lever engageable by said lug, the lever actuating key-locking mechanism, said lever also being movable transversely to move the counter-stop out of engaged position, and a margin-release key on the keyboard for moving said counter-stop out of engaged position, said lever also forming a counter-stop for engaging a margin-stop mounted on another bar; the margin-stops may be positioned in pairs on opposite sides of the center of the platen, and the sides away from their stopping faces may have inclined camming surfaces that push the yieldable counter-stop out of the way, the stopping faces of the margin-stops facing the center. In an alternative form margin-stops may be placed on the rotatable bar in all the adjustable positions and the corresponding counter-stop may be locked out of the engageable position when it is desired to use the usual margin-stops alone. These improvements are readily attachable at low manufacturing cost to existing models, being simple and robust.

The utilities derived from these improvements consist in enhanced ease and facility in typing on stationery of various sizes or copy of various kinds. An index enables a quick adjustment for any length of line or any size of sheet. The usual tabulating-stop mechanism may be retained in the machine for salutations, signatures, or any other desired intermediate stops, being centrally positioned when the pairs of margin-stops are opposed and equidistant from the center. Bell-ringing devices are engageable by the margin-stops to the right of the center of the platen. Ratchets may be employed on both bars for adjustably setting the margin-stops along the bars. An improved margin-stop is settable to any adjusted position and fixed on the rotatable bar.

Other features and advantages will hereinafter appear.

In the accompanying drawings—

Figure 1 is a perspective view with parts broken away.

Figure 2 is a side elevation of one of the margin-stops with the rotatable bar in cross-section.

Figure 3 is a front elevation of the rotatable bar and one of the margin-stops partly in section.

Figure 4 is a perspective view showing a blank formed before the ends are bent up as shown in Figure 2, and before the stop proper is attached.

Figure 5 is a right side elevation, partly in section, showing the ratchet construction for assuring one-way rotation of the rotatable margin-stop bar, and yieldably securing the margin-stop in any rotatable adjustment.

Figure 6 is a right side elevation showing a yieldable mounting of one of the bell-cranks whereby the margin-stop bar can be rotated in any position of the carriage.

Figure 7 is a side elevation partly in section.

Figure 10 is a perspective view of a numbered index for the adjustable positions of the rotatable margin-stop bar.

Figure 11 is a right side elevation of the margin-release key in the operated position.

Figure 12 is a diagrammatic view of a modification in which the counter-stop is held out of engaging position with the rotatable bar by a finger-lever.

Figure 13 is a perspective view showing eight margin-stops.

Figure 14 is an elevation in section showing a rotatable margin-stop bar having stops on only three sides, the vacant side being turned towards its counter-stop.

Figure 15 is an elevation in section showing a rotatable margin-stop bar having stops on all four sides, the counter-stop being the modified form shown in Figure 12 locked out of engageable position as shown in Figure 12.

Figure 16 is a diagrammatic view showing the bell-crank just released by the engaged margin-stop on the rotatable bar, about to strike in the direction of the arrow.

Figure 17 is a diagrammatic view showing the margin-stop on the rotatable bar engaged with its counter-stop, the latter being in engagement with the key-lock lever which has been moved to the left to lock the key-levers.

Figure 18 shows a copy-form typed on the machine when the innermost pair of margin-stops are set in engageable positions.

Figure 19 is similar to Figure 18 but with a wider copy-form and a pair of margin-stops spaced further apart.

Figure 20 is similar to Figure 19 but with a still wider copy-form and a pair of margin-stops spaced still further apart.

Figure 21 shows a copy-form of five different lengths, the top line being margined by the innermost pair of margin-stops and the next three lines being margined by the succeeding pairs of margin-stops when the bar shown in Figure 9 is rotated, and the bottom line by the margin-stops mounted on the ends of the forward margin-stop bar.

Figure 22 is similar to Figure 21 but the margin-stops forming the left one of each pair on the rotatable bar have been removed, so the copy is carried out to the left edge.

Figure 23 is similar to Figure 22 but the margin-stop on the front bar at the right has been moved to the left to stop the carriage at the ends of the lines in any position of the rotatable margin-stop bar.

Figure 24 is a view showing a copy made with the pair of margin-stops on the front cross-piece and a pair of margin-stops on the rear cross-piece and effected by operating the margin-release key.

Figure 8:
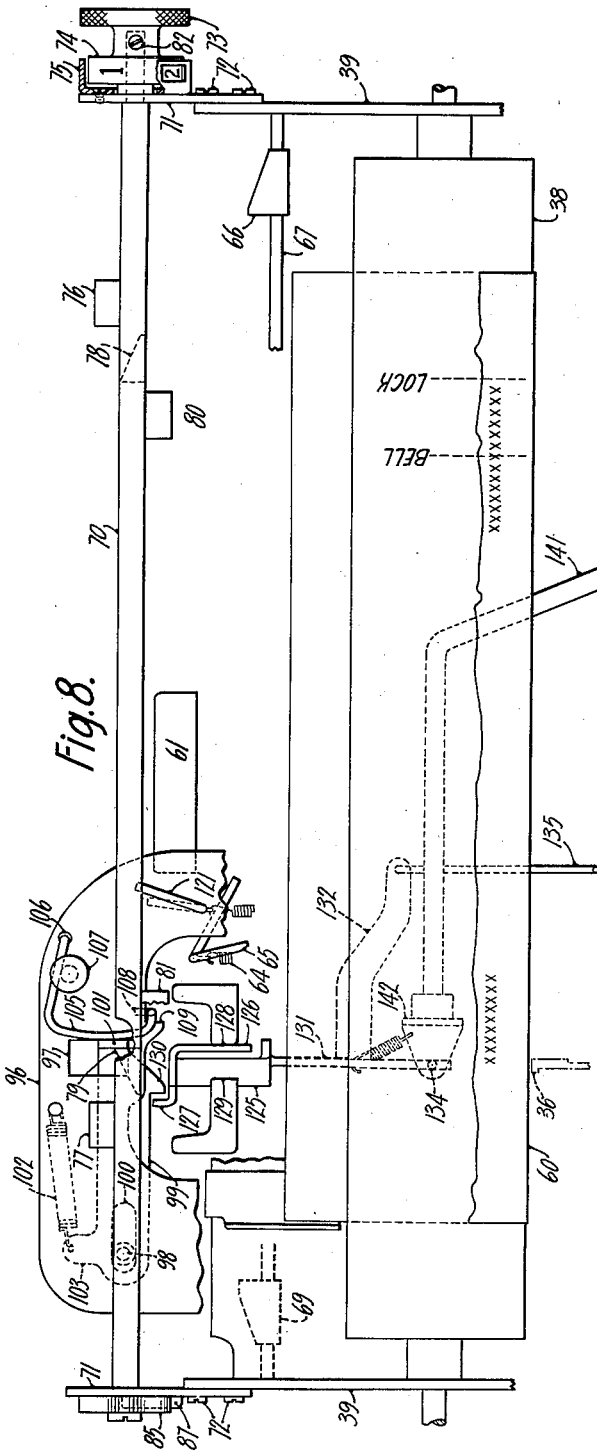
Figure 8 is a plan view showing one of the counter-stops in banking carriage-return position in engagement with the spring silencer.

A noiseless typewriter has the usual main frame 30 supported on legs 31. Key-levers 32 are fulcrumed on a pivot rod 33, and have the usual restoring springs 34 and type-action links 35 which actuate, through a usual noiseless type-action not shown, type 36. Upstanding and forwardly turned extensions 37 on key-levers 32 provide means for locking the key-levers as described hereinafter. A platen 38 shiftable to upper and lower-case positions is rotatably mounted in sides 39 of a platen-carriage 40 which is supported for reciprocatory movement by anti-friction ball-bearing tracks 41 on a trackway-frame 42 mounted for case-shift movement on the main frame 30, from which on either side are depending lugs 43 which are pivoted to shift-arms 44 connected with a cross-bar 45 pivoted on uprights 46 mounted on the main frame 30. The usual paper table 47, paper apron 48 and side guide 49 are shown in Figure 7. An arm 50 extending rearwardly from the platen-carriage 40 is connected with a strap 51 which is also connected with a spring-power drum 52. A carriage-feed rack 53 meshes with a gear wheel 54 mounted on a shaft 55, which supports an escapement wheel 56, which in combination with escapement dogs 57 controls the letter-space feed of the platen-carriage 40.

Work-sheets 60 of stationary of the usual rectangular form are illustrated in Figure 8, and Figures 16 to 24, inclusive. A usual bell 61 sounds the approach of the end of a line when struck by the lower end of a bell-crank 62 rotatably mounted in a bracket 63, the latter secured on an inside wall of the main frame 30. A spring 64 tied to an ear on the bell-crank 62 and to a post 83 on the main frame 30 tends to hold the bell-crank 62 in the normal operative position in which the upper arm 65 engages the margin-stop 66 slidably mounted on the toothed cross-piece or bar 67 and settable in any selected position by a screw 68. The left face of the margin-stop 66 is perpendicular to the cross-piece 67 and the rear face is beveled from the side toward the stop face inwardly toward the cross-piece 67. Another margin-stop 69 is also slidably mounted on the cross-piece 67 to the left of the margin-stop 66 and is settable by a screw 68 and is otherwise similar to the margin-stop 66 except that its rear beveled camming face recedes in the opposite direction. To the rear of and in parallel with the cross-piece 67 a bar 70 which may be square in shape is rotatably mounted in upwardly and rearwardly extending arms 71 secured on the sides 39 of the platen-carriage 40 by screws 72. On the right end of the bar 70 is mounted, and secured by a screw 82, a knurl 73 for rotating the bar 70 to a plurality of adjusted positions which may be four, as shown, one for each side of the bar. A cylindrical wheel 74 is secured on the bar 70 to the left of the knurl 73 and on its periphery on a Celluloid tape, for example, are a series of characters indicating, when exposed through an aperture in the cover 75 secured on the outside of the right bracket arm 71, the adjusted position of the rotatable bar 70.

Pairs of margin-stops are mounted on the bar 70, margin-stop 76, at the extreme right having its stop-face opposed to that of margin-stop 77 at the extreme left, on one side of the bar 70, margin-stop 78 next toward the center at the right having its stop-face opposed to that of margin-stop 79 next toward the center at the left, on the next side of the bar 70 in a clockwise direction, and nearest the center a third pair of margin-stops 80, 81, with their stop-faces opposed to each other on the third side of the bar 70 in a clockwise direction. As shown in Figure 13 the fourth side of the bar 70 is vacant with the index showing "0". As shown in Figures 1, 5, and 8, the bar 70 is rotatable in only one direction, and is secured in any of the adjustments by means of a toothed-wheel 85 fixed on the rotatable bar 70 and having intermediate recesses 86, the teeth of the wheel 85 and recesses 86 being engaged by a pawl 87 pivoted on a pin 84 on the left arm 71 and yieldably held in engagement by a spring 88 pinned to the end of the pawl 87 and to the arm 71.

Figure 9:
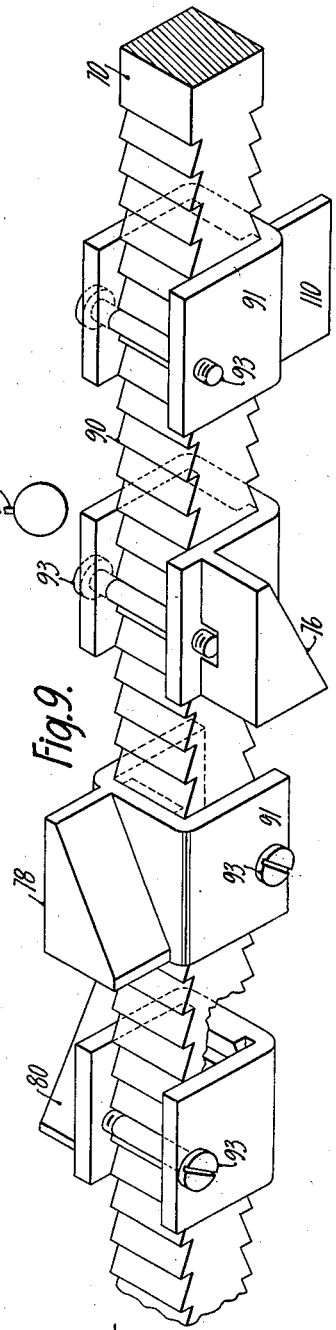
Figure 9 is a perspective view of a part of the rotatable bar showing four forms of margin-stops, one for each of four sides of the bar.

As shown in Figures 2, 3 and 9, the bar 70 may be ratched with parallel stop teeth 90 on opposite sides of the bar. Each stop mounting 91 is formed with a blank stamping 89 as shown in Figure 4 having a central ratcheted portion having stop teeth 92 of the same size as and adapted to engage the stop teeth 90 on the bar 70 as shown in Figure 2. The apertured sides of the blank are bent up along the bend lines B, B, and the mounting may be locked on the bar 70 in any adjustment by means of the screw 93 which engages the proximate tooth 90 and ties together the sides of the mounting 91 snugly against the straight side walls of the bar 70. The stops 76, etc., may be suitably secured as by rivets on either of the side walls or the bottom of the mounting 91 for four different sides of the bar 70 as shown in Figure 9.

A bracket 94 (see Figure 1) is secured by screws 95 on the rear wall of the track-supporting cross-piece 42, which terminates at the top in a downwardly and rearwardly inclined table 96 having a central rectangular aperture 97 and overlying the tabulating mechanism which will be hereinafter described. A pivot screw 98 is mounted on the bottom of the table 96 towards the left. A flat piece 99 is provided with an elongated slot 100, the walls of which provide a pivotal and slidable mounting of the piece 99 on the pivot screw 98. The piece 99 terminates at the right end in an upwardly turned perpendicular counter-stop 101 which passes up through and is freely movable in the slot 97 both transversely and laterally. A spring 102 is secured to a left rearward extension 103 from the flat piece 99 and to a pin 104 fastened on the under side of the table 96, so that the stop 101 tends in every position in the aperture 97 to take the extreme right and the extreme forward position shown in Figures 1, 8, and 16. This stop 101 in this operative position is also in an engageable position with any stop 76, etc., on the rotatable bar 70 when the bar is rotated to position any stop on the bottom of the bar 70. When the carriage is moved from right to left in the typing operation the margin-stops 76, 78, and 80 at the right side of the bar 70 are effective, if rotated selectively into engageable position with the counter-stop 101, to engage the counter-stop 101 and to stop the platen-carriage, but when the platen is returned from left to right the inclined camming surfaces on the opposite sides of the margin-stops 76, 78, and 80 engage the forward edge of the counter-stop 101 and push the counter-stop 101 to the rear against the tension of the spring 102 until a margin-stop has passed the counter-stop when the spring 102 immediately restores the counter-stop 101 to the operative engageable position. And vice versa when the platen-carriage is moved from left to right to return it to the beginning of a line the margin-stops 77, 79, and 81 are selectively engageable with the counter-stop 101, and their opposite sides have inclined camming surfaces that push the counter-stop 101 back out of the way if they engage the counter-stop while the carriage is moving from right to left.

Referring to Figures 7, 8, 16, and 17, a stiff spring 105 has a bow-shaped engaging portion which tends to overlie the right side of the aperture 97 and provide a resilient banking stop or silencer cooperative with the counter-stop 101 when the platen-carriage is returned to the initial position. The rear end of the spring 105 is bent to the right and has a right-angled bend at the end by means of which it is pivotally secured in an aperture 106 in the inclined table 96, and is secured in the banking position by means of a stud 107, the head of which overlies the spring 105. The forward end of the spring is bent downwardly and rearwardly to form a hook 108 which normally resiliently engages a perpendicularly faced lug 109 projecting forwardly from the table 96. Figure 8 illustrates the hook 108 spaced to the right of the lug 109 while the spring 105 is pressed back by the counter-stop 101 until the counter-stop 101 engages the right side of the rectangular aperture 97. The spring 105 is rather stiff so that it absorbs the noise of a severe banking motion when the carriage is returned.

An arm 125 extends downwardly and ends in a forwardly extending arm 131, that is supported along a substantially vertical pivot axis by the pivot-pins 133 and 134. The downwardly extending arm 125 supports at the top a forward right-angled extension 126 and below this extension another rearward right-angled extension 127. A central buttress of the main frame 30 has a top central aperture bounded by right and left stop-faces 128, 129.

The upper extension 126 is a counter-stop that normally lies in the path of the front margin-stops 66 and 69. The lower extension 127 is a counter-stop that normally lies in the path of a perpendicular right-angled stop-face on a forward lug 130 integral with the flat plate 99 and therefore with the counter-stop 101. It is now clear that as the carriage travels along in letter-feed direction from right to left, the counter-stop 101 is moved across the aperture 97 from the right side to the left side (inasmuch as the flat piece 99 is slidably mounted by means of the pin 98 and the elongated slot 100) and with it the integral lug 130 which in turn tilts the upright arm 125 to the left, see Figure 17. Similarly when a front margin-stop 66 engages the counter-stop 126 when the carriage is traveling in letter-feed direction the counter-stop 126 is carried along to the left from the frame stop-face 128 to the stop-face 129. The inclined camming face of the margin-stop 66 pushes the counter-stop 126 rearwardly out of the path in the opposite direction.

This right-to-left movement may be given to the arm 125 directly by the stop 66, or by one of the stops 76, 78 or 80, through the slide 99. Such movement swings the horizontal and forwardly extending arm 131, and a right-angled finger 132, on the underlying and overlying pivot pins 133, 134, to draw rearwardly a link 135 pivotally connected to the outer end of the finger 132 and having its front end secured in a manner well known in the art to an upstanding flange on a cross-piece 136 pivotally mounted in the frame of the machine on side arms 137. This vertical flange of the cross-piece 136 is thereupon drawn rearwardly under the extensions 37 to lock the key-levers 32 against operation. If the rotatable bar 70 has a pair of engaging margin-stops on every one of the four faces in every position engageable with the counter-stop 101, as margin-stops 110, 111, one on the right and one on the left on the vacant side of the bar 70 and otherwise similar to the margin-stops 76, 77, etc., in this case the index dial 74 will carry in the proper place a numeral "4" as shown in Figure 12 instead of the numeral "0" as shown in Figure 13, in the case of a four-sided bar 70.

But in the case of a bar 70 having margin-stops in all of the adjustable engageable positions a device such as is shown in Figures 12 and 15 may be used to make the margin-stops ineffective. The flat stop-piece 99 has a rearward right extension 113 terminating in a hook 114 which pivotally engages a pin 115 mounted on a bell-crank 116 which is pivotally secured by a pivot 117 on the under side of the inclined table 96. A finger-piece 118 permits the bell-crank 116 to swing on the pivot 117 to the position shown in Figure 12 in which the counter-stop 101 is held back to the rear of the aperture 97 and out of engageable position with any margin-stop on the rotatable bar 70. But when the pin 115 is swung to the left on the pivot 117 the spring 102 returns the counter-stop 101 to engageable position in the front of the aperture 97. A slightly resilient arm 119 is secured to the upper end of the pivot 117 to swing simultaneously with the bell-crank 116. The outer end of the arm 119 supports a post 120 which engages the upper end of a signalling bell-crank 121 to hold it also out of engageable position. A stop recess 122 is engaged resiliently by a protuberance 123 to lock the arm 119 yieldably in an inoperative position of the bell-crank 116. It is evident that the key-lock is automatically operated when either forward or rearward margin-stops to the right of the center of the platen engage their associated counter-stops. The same mechanism in part serves to release any margin-stop and the corresponding counter-stop. As clearly shown in Figures 1 and 7 a margin-release lever 138 is pivoted on a horizontal pivot screw 139 mounted in the side of the frame and is depressed against a spring 140. A slot in the hind end of the lever 138 engages the forward arm of a crank 141 which has a bearing in the side wall of the machine and which is rigidly secured to the side wall of a yoke 142 which mounts the pivot pins 133, 134. It is now clear that as the margin-release-key is depressed the arm 125 is tilted downwardly and rearwardly, releasing the right-angled extension or counter-stop 126 from engagement with the margin-stop 69 and simultaneously and concomitantly pushing back the sliding flat-piece 99, causing it to swing about the pivot 98 and remove the stop-face of the counter-stop 101 from engagement with the stop-face of any of the right margin-stops on the rotatable bar 70. The release of the margin-stops permits additional type impressions as is well known in the art.

When typing beyond the pre-set margin is desired, it is only required to momentarily depress the margin-release lever 138 to release either counter-stop from its corresponding margin-stop. The actuation of margin-release lever 138 swings the lever 125 rearwardly, thus pressing slide-plate 99 to disengage the counter-stop 101 from the stop-face of margin-stop 78 and, by the tension of spring 102, the counter-stop jumps ahead of the said stop-face so that after release of the margin-release lever, counter-stop 101 will not resume engagement with the stop-face but may move beyond same as during additional typing. In such instance the margin-stop 66, co-operating with its counter-stop 126, may serve to limit any excessive line-length and will function in accordance with its setting to lock the key-levers 32 in the manner previously described, now operating independently of the slide-plate 99. In the release of counter-stop 126 from the margin-stop 66, to permit further typing at the end of a line, the action is similar to that of counter-stop 101 just described since, during the key-locking function, arm 131 is being swung under tension of its spring so that upon release of counter-stop 126 same snaps beyond the stop-face of margin-stop 66.

The tabulator-stop device illustrated in Figure 7 is similar to that shown and described in Patent No. 2,074,333 and comprises a tabulator key 143 which operates a lever 144 pivoted on a cross-rod 145 and engaging at the rear end a tabulator counterstop 146 mounted in a tabulator housing 147. The inner top wall of the housing 147 has an inclined groove 148 in which the inclined top of the tabulator counter-stop 146 is slidably mounted. A forwardly and upwardly inclined slot 149 is provided in the lower portion of the counter-stop 146 so that the depression of a tabulator key 143 moves the counter-stop 146 upwardly and forwardly. Mounted on arms 150 which are inturned at their lower ends and which depend from the sides 39 of the carriage is a tabulator rack 151 which slidably supports tabulator stops 152. These stops 152 are key-settable, as is well known in the art by a lever 153 pivotally mounted on a cross-rod 154 and to which is pivoted a bent arm 155 connected with a setting key (not shown). The tabulator stops are used for such stops as dates, salutations and signatures. Referring to Figure 6 the bell-crank 121 is slidably mounted in an arm 156 which in turn is mounted on the trackway-frame 42. A spring 157 also anchored to the frame 42 holds the bell-crank 121 in its uppermost position with a collar 158 fast on the bell-crank 121 in engagement with the arm 156. This construction permits the rotatable bar 70 to be rotated in the counterclockwise direction in any position of the platen-carriage. The bell-cranks 62, 121 are set so that alarms are sounded at predetermined numbers of letter-spaces in advance of the engagement of the margin-stops and the counter-stops. When the carriage is returned the yieldably mounted bell-cranks are pushed aside until the margin-stops have passed them.

Reference is made to Figures 18 to 24, inclusive. In Figure 18 the date line on the stationery 60 is set by a tabulator stop. The second, fourth, fifth, sixth, and seventh lines are set by the innermost left-hand margin-stop 81 and the right margin by the stop 80. The start of typing in the third and last lines is determined by tabulator stops. In Figure 19 the body of the letter is margined by the margin-stops 78, 79, and in Figure 20 by the margin-stops 76, 77. In Figure 21 five lines of different length are shown, margined in order from top to bottom by the following respective pairs of stops, 80, 81; 78, 79; 76, 77; 110, 111 (Figures 9 and 15), on the rotatable bar 70, and the regular margin-stops, 66, 69, in the order set forth. After rotating the bar 70 successively to margin the first four lines, the finger-piece 118 is pulled forward to lock the counter-stop 101 back out of engageable position with the margin-stops on the rotatable bar 70. In Figure 22 is a copy made from a machine in which all of the left margin-stops of each pair of margin-stops on the rotatable bar have been removed or rendered ineffective, thus leaving four margin-stops on the right, the last line being margined by the usual margin-stops 66, 69. In Figure 23 the copy is margined at the left in the reverse order to that in Figure 21 but each line is margined at the right by the usual margin-stop 66 set nearer the center than any of the other right margin-stops. In Figure 24 the first two lines and the last two lines are margined by a pair of stops on the rotatable bar 70, the intermediate four lines of copy being margined by the usual margin-stops on the front bar 67. The bell is sounded and the keys are locked by the right margin-stops on either bar.

From the foregoing examples of operation it will be seen that the various pairs of margin-stops carried on the rotatable bar 70 may be selectively set to define different line-lengths particularly for the body of typewritten matter to be typed on the stationery 60, the latter being of various widths, these stops in the form shown in Figure 1 being fixed on bar 70 in such respective positions as to determine the different lengths of typed line; and in the form illustrated in Figure 9, these stops being selectively adjustable along bar 70 to vary each of the line-lengths at will. It will also be seen that the stops 66 and 69, being position-adjustable along the bar 67, may co-operate, through the counter-stops 101 and 126, with the stops of bar 70 to determine any line-lengths or margins within or beyond the range of typing controllable by the stops of bar 70, in that the stops 66 and 69 may be set at will to any position over the entire length of carriage movement. Also, if desired, the tabulator-stop device, shown in Figure 7, may be employed in a manner similar to the stops of bar 67 to determine any line-lengths or margins within or beyond the range of the stops on bar 70.

Variations may be resorted to within the scope of the invention, and portions of the improvements may be used without others.

Having thus described my invention, I claim:

1. In a typewriter comprising a frame, a reciprocating platen-carriage thereon, keys for operating the typewriter, and means for locking said keys, in combination, a first bar and a second bar mounted on the platen-carriage in parallel with each other and with the platen-carriage, margin-stops mounted on said first bar, said second bar being rotatable to a plurality of adjustable positions, a plurality of margin-stops spaced lengthwise and circumferentially on the rotatable bar, a counter-stop mounted on the frame and engageable with the margin-stops on said first bar, and a second counter-stop mounted on the frame and engageable with certain of the margin-stops on the rotatable bar, said second counter-stop being slidable substantially parallel with the platen-carriage to actuate said key-locking means.

2. In a typewriter having a frame and a reciprocating platen-carriage thereon, in combination, a first bar and a second bar mounted on the platen-carriage in parallel with each other and with the platen-carriage, margin-stops mounted on said first bar, said second bar being rotatable to a plurality of adjustable positions, a plurality of margin-stops spaced lengthwise and circumferentially on the rotatable bar, a counter-stop mounted on the frame and engageable with the margin-stops on said first bar, a second counter-stop mounted on the frame and engageable with certain of the margin-stops on the rotatable bar, said second counter-stop being movable into and out of operative position, key-means for temporarily moving said second counter-stop out of operative position, and means for moving and locking said second counter-stop out of operative position.

3. In a typewriter having a frame and a reciprocating platen-carriage thereon, in combination, a first bar and a second bar mounted on the platen-carriage in parallel with each other and with the platen-carriage, margin-stops mounted on said first bar, said second bar being rotatable to a plurality of adjustable positions, a plurality of margin-stops spaced lengthwise and circumferentially on the rotatable bar, a counter-stop mounted on the frame for engaging the margin-stops on said first bar, a second counter-stop mounted on the frame for engaging certain of the margin-stops on the rotatable bar, said second counter-stop being movable into and out of operative position, key-actuated means for moving said second counter-stop out of operative position, a spring for restoring said second counter-stop to operative position, means independent of said key-means for moving and locking said second counter-stop out of operative position.

4. In a typewriter having a frame and a reciprocating platen-carriage thereon, in combination, a first bar and a second bar mounted on the platen-carriage in parallel with each other and with the platen-carriage, margin-stops mounted on said first bar, said second bar being rotatable, a plurality of margin-stops spaced lengthwise and circumferentially on said rotatable bar, a counter-stop mounted on the frame for engaging a margin-stop on said first bar, a second counter-stop mounted on the frame for engaging certain of the margin-stops on the rotatable bar, all of the margin-stops on said rotatable bar and the corresponding counter-stop being relatively adjustable to both operative and inoperative positions, a margin-release key, and means actuated by said margin-release key for moving both said counter-stops to non-cooperative positions relative to the margin-stops.

5. In a typewriter having a frame and a reciprocating platen-carriage thereon, and keys for operating the typewriter, in combination, a first bar and a second bar mounted on the platen-carriage in parallel with each other and with the platen-carriage, margin-stops mounted on said first bar, said second bar being rotatable, a plurality of margin-stops disposed lengthwise and circumferentially on said rotatable bar, a slightly displaceable counter-stop mounted on the frame engageable and displaceable by a margin-stop on said first bar, a slightly displaceable second counter-stop mounted on the frame and engageable and displaceable by certain of the margin-stops on the rotatable bar, all of the margin-stops on said rotatable bar and the corresponding counter-stop being relatively adjustable to both operative and inoperative positions, and single key-locking means actuated by the displacement of either said counter-stops.

6. A typewriting machine comprising, in combination, a frame, a platen-carriage mounted for reciprocatory movement on said frame, keys for operating the machine, a front bar and a rear bar mounted on the platen-carriage behind the platen, and in parallel with the platen and with each other, the front bar being fixed, a plurality of margin-stops mounted on said fixed bar for adjustment in parallel with the platen, the rear bar being rotatably mounted, a counter-stop mounted on the frame and engageable with said front-bar margin-stops in either direction of movement of the carriage, the rear bar being rotatably adjustable to a plurality of adjustable positions, means for indicating to the operator the adjusted position, a plurality of pairs of margin-stops mounted on and circumferentially disposed around the rotatable bar, each pair of margin-stops being disposed lengthwise with respect to the other pairs and operative in opposite directions in one of the adjusted positions of the rotatable bar, a second counter-stop engageable with certain pairs of margin-stops on the rotatable bar in their adjusted operative position, said second counter-stop being mounted to move out of operative position, a spring for restoring said second counter-stop to operative position, any part of the engaging portion of a non-stopping surface of the rotatable margin-stops forming an inclined camming surface that moves said second counter-stop out of operative position, a forward extension on said second counter-stop, a lever arm engageable with said extension, means actuated by said lever arm for locking said keys, and a margin-release key for actuating said lever arm to move said second counter-stop out of operative position.

7. In a typewriter having two members, namely, a frame and a carriage movable relative to each other in letter-feed and return directions, in combination, a rotatable bar mounted on one of said members, right and left margin-stop means upon said bar, counter-stop means adapted to cooperate with said left and right margin-stop means for limiting the said relative movement between the two members, means to rotate said bar to thereby effect a simultaneous adjustment of the left and right margin-stop means to change the limits of carriage movement, a second bar mounted on one of said members, margin-stop means on said second bar, said counter-stop means also adapted to cooperate with the said margin-stop means on the said second bar, and settable means to move and hold said counter-stop means to cooperate with the margin-stop means on one or both of said bars.

8. In a typewriter having two members, namely, a frame and a carriage movable relative to each other in letter-feed and return directions, in combination, a margin-stop mounted for adjustment parallel to the carriage movement on one of said members, counter-stop means cooperatively associated with said margin-stop, additional margin-stops mounted on one of said members and offset from one another transversely to the direction of carriage travel, said counter-stop means also associated with said additional margin-stops, means to select the desired one of said additional stops for cooperation with the said counter-stop means, and means including a single manipulative member to suppress cooperation between all said margin-stops and the said counter-stop means.

9. In a typewriter, having a frame, a letter-feeding carriage, a set of type-keys, and a plurality of margin-stops, in combination, a counter-stop associated with one of said margin-stops, a counter-stop associated with a plurality of other margin-stops, said counter-stops being slightly displaceable in letter-feed direction when contacted by a margin-stop, means to relatively adjust said one margin-stop to and from cooperative position with its associated counter-stop, means to select any of said other margin-stops to cooperative association with its counter-stop, and a normally ineffective type-key lock, operatively connected to both said counter-stops, said counter-stops being both operative when displaced by said margin-stops to lock the said type keys.

10. In a typewriter having two members, namely, a frame and a reciprocating platen-carriage thereon, in combination, a plurality of margin-stops on one of said members and offset from one another transversely in the direction of carriage travel, a counter-stop associated with one of said margin-stops, a counter-stop associated with the other of said margin-stops, said counter-stops being mounted on the other of said members, means for relatively adjusting one of the counter-stops and the associated margin-stop to both cooperative and non-cooperative positions, and a margin-release lever operative for rendering all said margin-stops and associated counter-stops non-cooperative.

11. In a typewriter having a frame and a reciprocating platen carriage thereon, in combination, a plurality of margin-stops on said platen-carriage and offset from one another transversely in the direction of carriage travel, a counter-stop cooperatively associated with one of said margin-stops, a counter-stop associated with the other of said margin-stops, means to select any one of said other margin-stops for cooperation with its associated counter-stop, said counter-stops being mounted on the frame, means to relatively move one of the counter-stops from margin-stop cooperative position to non-cooperative position, and single control means for relatively moving said both counter-stops out of cooperative position with all the margin-stops.

12. In a typewriter having a frame and a reciprocating platen-carriage thereon, in combination, a first bar and a second bar mounted on the platen-carriage in parallel with each other and with the platen-carriage, margin-stops mounted on said first bar, said second bar being rotatable to a plurality of adjustable positions, a plurality of margin-stops spaced lengthwise and circumferentially on the rotatable bar, a counter-stop mounted on the frame for engaging a margin-stop on said first bar, a second counter-stop mounted on the frame and adapted to cooperate with one of said circumferentially spaced margin-stops in each of said adjusted positions of the rotatable bar, said second counter-stop being movable into and out of cooperative position with said circumferentially spaced stops, and means to move and hold said second counter-stop in or out of cooperative position with the circumferentially spaced stops.

13. In a typewriter having a frame-member and a carriage-member movable across the frame, in combination, a bar extending parallel to the carriage and mounted pivotally upon one of said members, margin-stops mounted lengthwise and circumferentially spaced on said bar, a line-end signal device including a signal-operating arm mounted on the other of said members, means to rotatively adjust said bar to thereby operatively align the desired margin-stop with said signal operating arm for operation thereof during the carriage movement, and means to give the said signal-arm the capacity for idle displacement substantially transverse to the carriage travel by any margin-stop that may collide with it during a rotative adjustment of said bar.

ALFRED G. F. KUROWSKI.